3,059,548
SPREADER FOR PLASTIC TUBES
Yale Kaplan, West Hartford, and Warren Jaquiery, Watertown, Conn.; Frances Kaplan, executrix of said Yale Kaplan, deceased, assignors to Monsanto Chemical Company, St. Louis, Mo., a corporation of Delaware
Filed Mar. 2, 1960, Ser. No. 12,367
1 Claim. (Cl. 93—20)

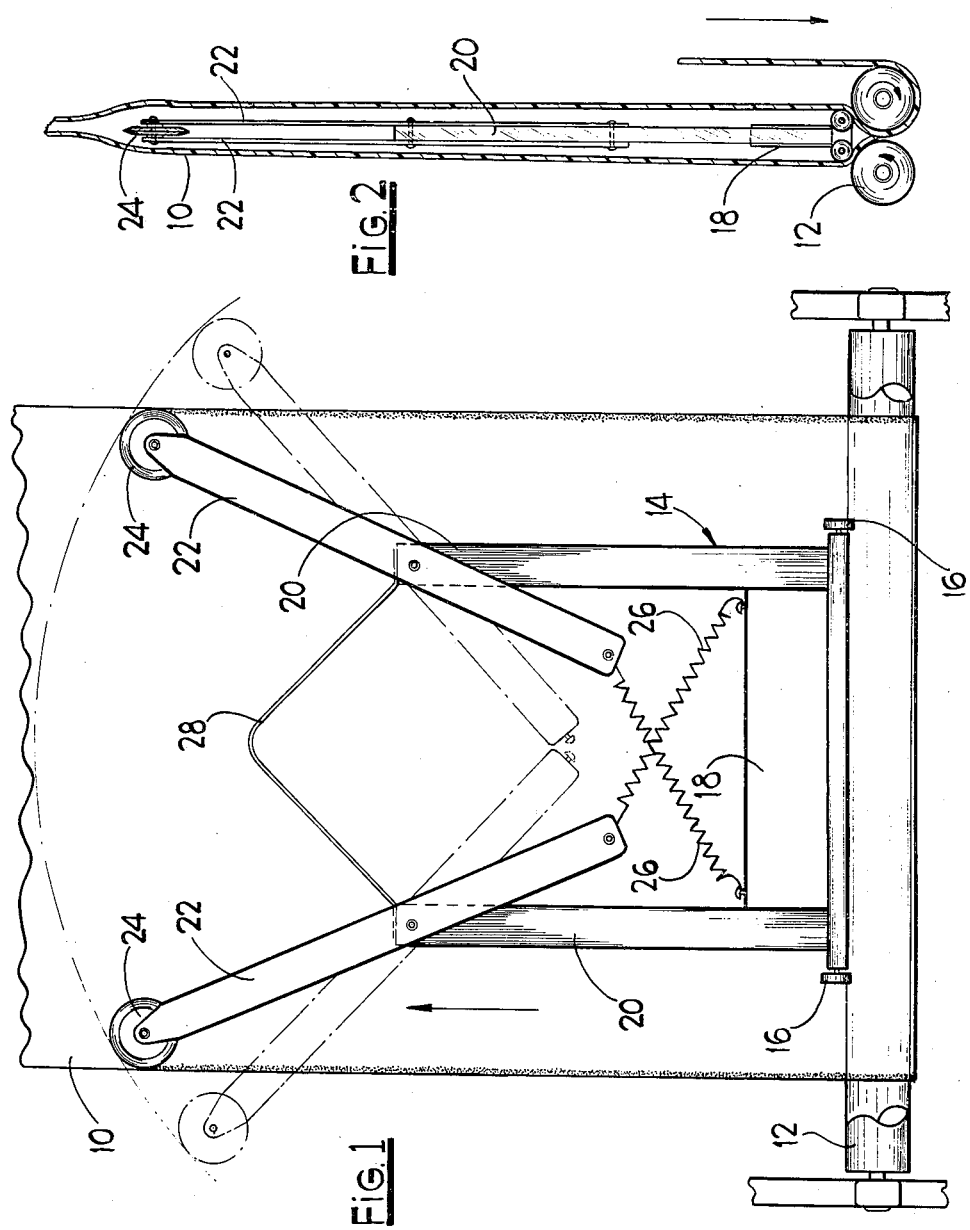

This invention relates to plastic bag making machines and more particularly to a bag making machine which uses a continuous tube of plastic material fed to the machine from a roll of the material in flattened condition.

An object of primary importance of the invention is to provide a spreading or opening means for the surfaces adjacent the folded edges of the flattened tube which tend to cling firmly together.

A feature of importance of the invention is that the spreader device is placed within the tube between the guide rolls for the material and the operative parts of the bag forming machine, the device having wheels spring pressed outward and resiliently pressing against the inside edges of the material at the folds of the flattened tube.

Another feature that is important is that the spreader device may rest on rollers between which the flattened tube is guided and fed to the bag forming machine and which rollers may ride over the inner surface of the tube.

And finally it is an object of importance to provide small spring pressed wheels engaging the opposite folds of the tube, the rollers being outwardly forced by spring means to separate the internal surfaces of the tube adjacent the folds.

With the above and other objects in view the invention may include the features of construction and operation set forth in the following specification and illustrated in the accompanying drawing.

In the accompanying drawing annexed hereto and forming a part of this specification, we have shown the invention embodied in a spreading or separating device for a continuous tube of large diameter folded into flattened condition, but it will be understood that the invention can be otherwise embodied and that the drawing is not to be construed as defining or limiting the scope of the invention, the claim appended to this specification being relied upon for that purpose.

In the drawings:

FIG. 1 is a front elevation of the spreading device shown in position within a flattened tube of transparent plastic material; and FIG. 2 is a transverse sectional view of the spreading device shown in FIG. 1.

In the above mentioned drawing, there has been shown but one embodiment of the invention which is now deemed preferable, but it is to be understood that changes and modifications may be made within the scope of the appended claim without departing from the spirit of the invention.

Referring more in detail to the figures of the drawing, it will be seen that a flattened tube of plastic material 10 is passed between transversely extending horizontal rollers 12 and passes upward still in flattened condition. Due to the tube being tightly rolled in flattened condition the surfaces of the tube adjacent the folds have a tendency to adhere firmly together. To separate these portions prior to the tube being operated on, a frame 14 is placed within the tube 10 which at its lower end has spaced apart rollers 16 riding on the inner surface of the tube as the tube emerges between the rollers 12 one of which may be a feed roller for the tubular material.

The rollers 16 for the spreader frame 14 as shown are rotatably mounted at the opposite lower corners of a heavy metal member 18 forming part of frame 14 and which provides sufficient weight to retain the spreader in its position riding on the guiding and feeding rolls 12.

Extending upward from the lower weight member 18 are bars 20 at opposite ends of the weight member 18. At the upper ends of these bars 20 are pivotal levers 22 having wheels 24 at their upper ends adapted to press against the inner surface of the flattened tube adjacent the folds on opposite sides of the tube.

To force the wheels 24 on the levers 22 outward, coiled springs 26 may be attached at one end to the lower ends of the levers 22. The opposite ends of the springs 26 are as shown fastened to the weight member 18.

To facilitate positioning the spreader 14 and to aid in removing the spreader from within the tube, a handle member 28 may be provided in the form of a bent rod having its ends attached to the upwardly extending rods 20 at their upper ends.

With the spreader 14 in position within the flattened tube and with the wheels 24 contacting the inner surface of the tube the wheels 24 are strongly forced outwardly against the inner surface of the tube adjacent the folds of the flattened tube. The force exerted by the springs 26 acting on wheels 24 is sufficient to separate any portions of the tube surfaces adjacent its folds that may have adhered together.

We claim as our invention:

A spreader for separating adhering surfaces adjacent the folds of a flattened tube comprising a substantially flat frame in planar relationship within said flattened tube, a pair of rollers rotatably mounted on the bottom of said frame and supported on horizontally positioned guide rolls between which the tube is advanced, levers pivotally mounted on said frame having their upper ends outwardly spring-pressed towards the opposing folds of said tube, and wheels rotatably mounted at the upper ends of said levers.

References Cited in the file of this patent
UNITED STATES PATENTS

| | | |
|---|---|---|
| 1,588,647 | Bates | June 15, 1926 |
| 2,615,375 | Rowe et al. | Oct. 28, 1952 |
| 2,631,332 | Reber | Mar. 17, 1953 |
| 2,720,680 | Gerow | Oct. 18, 1955 |
| 2,923,194 | Ambler et al. | Feb. 2, 1960 |